United States Patent [19]

Häeuser et al.

[11] Patent Number: 4,611,982
[45] Date of Patent: Sep. 16, 1986

[54] INJECTION-MOLDING SYSTEM FOR THE PROCESSING OF CASTING RESIN

[75] Inventors: Erhard Häeuser, Schoeffengrund; Wilhelm Hedrich, Ehringshausen, both of Fed. Rep. of Germany

[73] Assignee: Wilhelm Hedrich Vacuumanlagen GmbH & Co. KG, Ortsteil Katzenfurt, Fed. Rep. of Germany

[21] Appl. No.: 738,935

[22] Filed: May 29, 1985

[30] Foreign Application Priority Data

May 30, 1984 [DE] Fed. Rep. of Germany ....... 3420222

[51] Int. Cl.⁴ .............................................. B29C 45/53
[52] U.S. Cl. .................................. 425/543; 264/328.2; 417/349
[58] Field of Search ...................... 417/349, 392, 439; 425/542, 543; 264/328.2

[56] References Cited

U.S. PATENT DOCUMENTS

| | | | |
|---|---|---|---|
| 2,481,991 | 9/1949 | Ernst | 425/542 |
| 2,786,234 | 3/1957 | Beyer | 425/542 |
| 3,436,446 | 4/1969 | Angell | 425/543 |
| 3,860,801 | 1/1975 | Hunkar | 425/144 |
| 4,141,470 | 2/1979 | Schulte | 425/543 |
| 4,257,992 | 3/1981 | Schulte et al. | 425/543 |

*Primary Examiner*—Willard E. Hoag
*Attorney, Agent, or Firm*—Flynn, Thiel, Boutell & Tanis

[57] ABSTRACT

A casting system for the processing of casting resin. From evacuatable storage containers casting resin components are fed to pump cylinders. The movement of the pump cylinders is synchronized through a mechanical connection. The drive of the pistons in the pump cylinders occurs by means of driving fluids which approximately are under the same pressure as the resin components. Leakages across the pistons are avoided due to the pressure equality on both sides of the pistons even when, in consideration of abrasive filler materials, relatively large gaps must be provided between the pistons and their cylinders.

12 Claims, 5 Drawing Figures

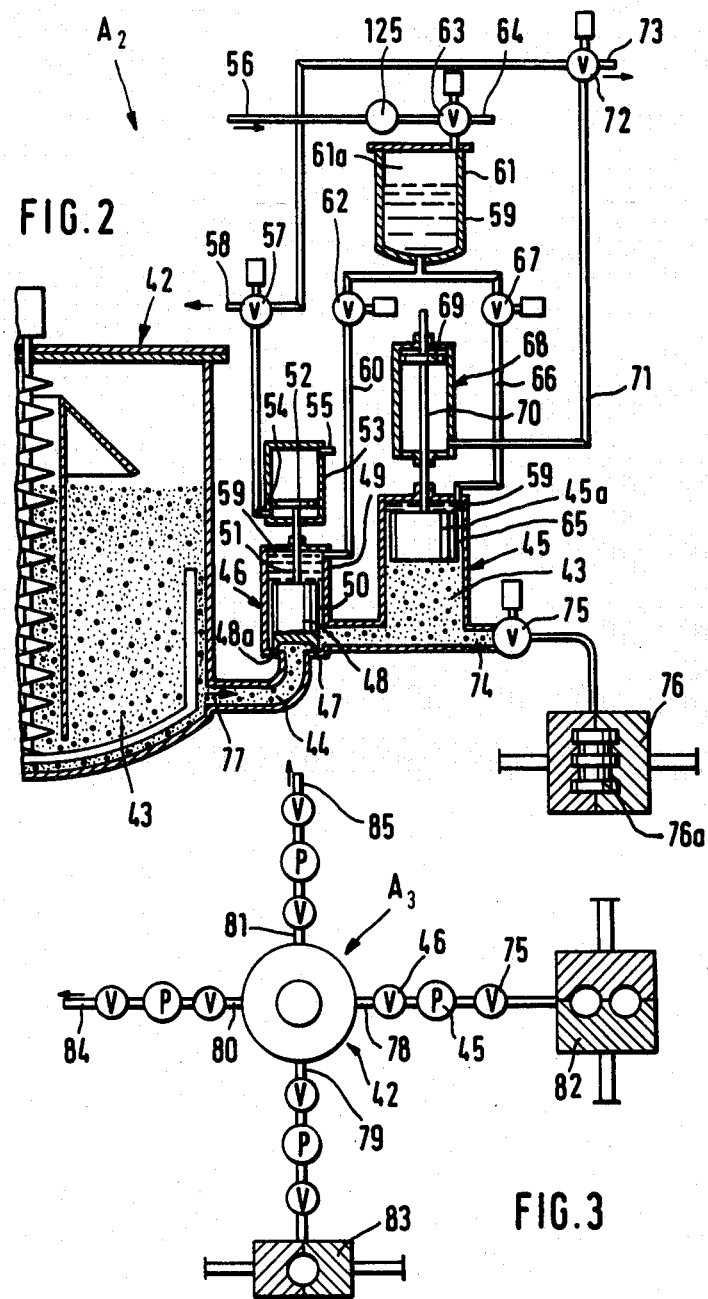

INJECTION-MOLDING SYSTEM FOR THE PROCESSING OF CASTING RESIN

FIELD OF THE INVENTION

The invention relates to an injection-molding system for the processing of casting (molding) resin with at least one pump cylinder, in which a piston is slidable, which piston divides the cylinder into a pump chamber for receiving the casting resin, or a casting-resin component, and a drive chamber for receiving a driving fluid which drives the piston.

BACKGROUND OF THE INVENTION

Casting resins are often mixed with fillers, for example powdered quartz, which are very abrasive. Piston seals, which lie closely to the cylinder wall, can in this case be used only to a limited degree, since the jamming of filler particles between the seal and cylinder wall would lead to a quick destruction of the seal and cylinder wall. A sufficient lifetime is obtained only when a gap is left between piston and cylinder wall, the width of which gap is so great that filler particles cannot be jammed therein. However, certain leakage flows are created by such gaps, which leakage flows are particularly disadvantageous when several components of the casting resin must be mixed together in a specific proportional relationship and subsequently guided to a mold and when during the gelling of the casting resin pressure is supposed to be maintained in the mold. During this pressure maintenance, only small amounts of resin per unit of time are further pressed into the mold, so that different leakages in several pump cylinders result in significant recipe (mixing proportion) adulterations.

Known (from German Pat. No. 27 48 982) is a system, in which the casting resin components are fed by means of dosing pumps to a mixer. Several buffer elements are fed from the mixer. A mold is associated with each buffer element. Said arrangement permits the pressure regulation in several molds to be independent from how long the gelling operation in the individual molds lasts. The buffer elements contain pistons, onto the one end of which acts a pressure medium, while the other piston end presses onto the casting resin and in this manner maintains a specific pressure in the associated mold and also displaces casting resin into the mold in order to compensate for the volume loss which takes place during gelling. The system is complicated, since aside from the dosing pumps also buffer elements are needed.

Further known (from German OS No. 25 54 233) is also a system with two pump cylinders with pistons, the piston rods of which project from the cylinders and are connected to a connecting bridge in order to force a synchronous movement of the pistons. This principle of the dosing is also known otherwise in the dosing technique, for example from German OS No. 23 24 098. The piston rod sides of the pump cylinders according to German OS No. 24 54 233 are loaded by a pressure medium.

Casting resin components which are packed into sacks are introduced into the cylinder chambers on the other end of the piston from the piston rod end. During closing of the cylinder chambers the sacks are slitted. The components are guided together in a spray gun. Nothing is said in the reference concerning the fit of the pistons in the cylinder.

The basic purpose of the invention is to construct an injection-molding system of the abovementioned type so that casting resins, including those with abrasive fillers, can be processed without creating leakages of a damaging degree out of the pump chamber.

This purpose is attained according to the invention by the piston being sealed off relative to the cylinder wall by a gap seal, by the casting resin or the casting resin components being introduceable free of a casing into the pump chamber, by the driving fluid being compatible with the casting resin or the casting resin components and by the active surfaces of the piston which come into contact with the driving fluid and the casting resin or the casting resin components being at least approximately of the same size.

The sealing of the piston by a gap seal makes the pump cylinder, or the pump cylinders, insensitive to abrasive fillers which are contained in the casting resin. Filler particles thus can penetrate into the gap between piston wall and cylinder wall without being jammed there. They therefore also cannot lead to the formation of grooves (scoring) which damage the piston and the cylinder wall. Since there is no seal which lies closely against the cylinder wall, destruction of such a seal cannot occur. Still leakages are practically completely avoided, since the same pressure exists on both ends of the piston, so that there exists no pressure gradients (drops) which could result in leakages. When the driving fluid is, as is preferable, supplied on the piston rod end of the piston, the pressure on the driving end of the piston is, because of the piston rod cross section, slightly greater than on the piston end which presses the casting resin into the mold or toward an outlet. Therefore, at most only small fluid amounts of the driving fluid could penetrate into the casting resin, while in this case by no means does casting resin get into the driving fluid. Due to the use of a driving fluid which is compatible with the casting resin, no disadvantages arise from the two fluids being mixed with one another to a small degree in the area of the gap between piston and cylinder.

The driving fluid preferably comprises at least in part the casting resin or a casting resin component. This, however, is not a condition for the realizing of the invention. The driving fluid can be any neutral fluid, which does not have a damaging influence on the casting resin, that is, does not change same in such a manner that the product is impaired. However, it is advantageous that the driving fluid does not contain any abrasive sedimentating fillers. Also the driving fluid should not harden. However, no fluid may be used as driving fluid which effects an undesired reaction in the casting resin or the casting resin component. For example, one will not use as driving fluid a hardener, if the respective cylinder is supposed to convey a hardness-free casting resin component.

The driving fluid can be pressurized in various ways. Particularly simple for this is the use of a pressurized gas.

In a preferred embodiment of the invention, the capacity of the pump chamber is larger than is needed for the complete filling of a single mold. Such an injection-molding system makes possible the complete filling of a mold and a subsequent pressure maintaining in connection with a follow-up pressure on the casting-resin mass, and thus the pressure regulating mentioned in the beginning, whereby the system has an extraordinarily simple design. The stroke size can also be dimensioned such that several individual portions can be produced with one piston stroke, in order to for example inject one charge of small parts in a vacuum chamber. During the break, which is created by ventilation, loading and evacuation of the casting chamber, the pump cylinder can be loaded anew.

A drive mechanism is advantageously associated with the piston. A loading stroke can be produced with such a drive mechanism, by which loading stroke can be sucked into the cylinder the mass which is to be conveyed later. However, a filling of the cylinder is also possible without such a drive mechanism, when the filling for example occurs under the action of the force of gravity or when a loading pump is provided.

By using several pump cylinders, thus in the case of a system in which several casting resin components are supposed to be mixed together according to a specific recipe (formula), a mechanical connection between the individual pistons is provided. This mechanical connection can in one simple design consist of a rigid connecting piece. Such connecting pieces are actually known, for example from the abovementioned German OS No. 25 54 233, but without a separate guide which is parallel with the cylinder axes. Such known piece has the disadvantage that a cocking of the pistons in the cylinder or the piston rods in their guides can be created, and the piston rods must then be constructed relatively thick, which results in greater pressure differences between the two ends of the piston. However, in the invention, by using a separate guide, thin piston rods can be used, which as a rule need absorb only pulling forces (tensile forces), so that the piston front end and the piston back end are approximately of the same size and thus the pressure difference on both ends of the seal gap is approximately zero. In place of a rigid connecting piece it would also be possible to provide for the mechanical connection a lever, which can pivot about a stationary fulcrum point and which operates several cylinders, which cylinders at their other ends are secured on a base. This permits effecting, with equal cylinder diameters, different volumetric deliveries per unit of time. Such demands are actually known, for example from German OS No. 27 12 610. In the case of a rigid connecting piece different cylinder diameters must be used, if the volumetric deliveries per cylinder are supposed to differ. This is possible without any problems in fitting gap seals, since fitting of elastic seals is not needed.

In a particularly simple construction of an inventive system, the mechanical connection is done by the pistons being parts of a differential piston. Separate connecting pieces are not needed in this case even if several cylinders are provided. In such a device it is advantageous to have close spaced annular chambers which surround sections of the differential piston and connect respective pump chambers to the mold or the like, since in the area of the seal gap noncompatible components leaking from one annular chamber to the other are quickly flushed through due to the constant passage of material through the annular chambers to the mold. The annular chambers may also be directly adjacent, possibly combined to one annular chamber.

The inventive injection-molding system is advantageously equipped with evacuatable storage containers for the casting resin. Qualitatively high-grade workpieces, for example electrical structural parts, like spools, must be created so that no cavities (shrink holes) exist in the injected casting mass. This can only be achieved if the casting resin or its components are carefully degassed prior to casting. The processing of degassed components is reliably possible with the inventive principle.

The inventive system is advantageously equipped with a valve construction by which reliable sealing of the inflow after the filling of the pump cylinder is achieved, even if the casting resin contains abrasive particles. Also, this valve operates according to the principle of the pump cylinders, namely the valve closing force is produced by a driving fluid which is compatible with the casting resin. Also in the closed condition of the valve, with a pump cylinder which is under pressure, there does not exist a pressure difference between the driving fluid and the casting resin or the casting resin component.

Several pump cylinders can be connected to a storage container which contains premixed (ready mixed) casting resin. With this, several injection points can be supplied independently from one another from one storage container.

Casting resin can be ejected in small individual portions with an apportioning means so that for example the filling of several small molds with one piston stroke is possible. The apportioning means can be either a passive device, that is a device which is operated only by the driving fluid, or instead an active, pumplike device. A pressure increase is also possible with an active device.

BRIEF DESCRIPTION OF THE DRAWINGS

Several exemplary embodiments of the invention are schematically illustrated in the drawings, in which:

FIG. 2 illustrates a system with which premixed resin is processed and which thus only has one pump cylinder;

FIG. 3 is a much simplified illustration of a system corresponding with FIG. 2, wherein several processing areas (injection points) are connected to a single storage container;

DETAILED DESCRIPTION

Figure 1:
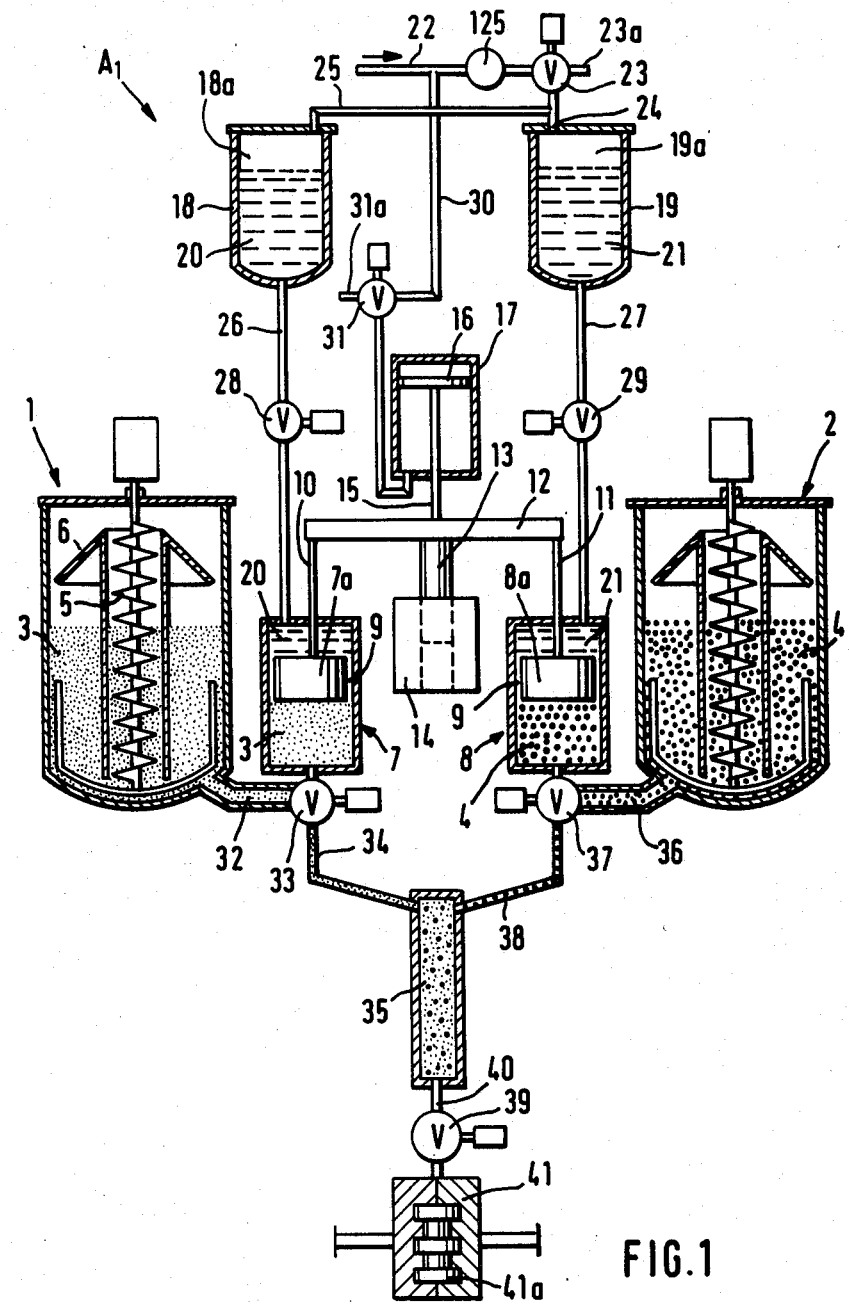
FIG. 1 illustrates a system for the processing of two components, whereby a mechanical connection of the two pump cylinders is created by a beam.

The system $A_1$, according to FIG. 1 has two storage containers 1 and 2 for casting resin components. Each of the storage containers is connected to a low-pressure source (not illustrated). The casting resin components 3 and 4 are circulated by means of conveyor worms 5. The resin which is moved up by the conveyor worms spreads out on a discharge chute 6, by which good degassification of the resin is achieved.

A pump cylinder 7 is associated with the storage container 1 and a pump cylinder 8 with the storage container 2. Pistons 7a, 8a are movable in the pump cylinders 7 and 8. Between the pistons 7a, 8a and the associated cylinders 7, 8 there exist gaps 9 which are wide enough that any filler particles in the resin cannot get jammed in such gaps, but are narrow enough to inhibit, as much as possible, the leakage of casting resin therethrough, which gaps 9 thus may be said to define gap seals.

Piston rods 10, 11 are connected to the pistons 7a, 8a, which piston rods project from the cylinders 7, 8. The piston rods 10, 11 are rigidly connected to a beam 12. A guide rod 13 is provided on the beam 12, which guide rod engages a guide member 14 which is provided with a guide bore. Based on the described connection, the two pistons 7a, 8a can move only together with the same speed.

An operating rod 15 engages the beam 12, which operating rod is the piston rod of a piston 16, which is movable in a compressed-air cylinder 17.

The system also includes containers 18 and 19 for receiving the driving fluid 20, 21. The containers 18, 19 are connected to a compressed-air source 22, namely through a valve 23 and lines 24, 25. A pressure-reducing valve 125 is arranged in front of the valve 23. Lines 26, 27 start out from the bottoms of the containers 18, 19, which lines lead to the pump cylinders 7, 8, namely in the area above the pistons 7a, 8a. Valves 28, 29 are built into the lines 26, 27.

A line 30 also leads from the compressed-air source 22 to the compressed-air cylinder 17, namely in the area below the piston 16. A valve 31 is built into the line 30.

The storage container 1 is connected through a large-volume line 32 to the pump cylinder, namely below the piston 7a. A valve 33 is provided at the inlet point, which valve on the one hand can connect the line 32 to the cylinder 7 and on the other hand a simultaneous closure of the mentioned connection and a path from the cylinder 7 to a line 34 which leads to a mixer 35. The cylinder 8 is similarly connected by a valve 37 either through a line 36 to storage container 2 or through a line 38 to the mixer 35.

A valve 39 is provided below the mixer 35, which valve is built into an injection (casting) line 40. The injection line 40 leads to a mold 41, the cavity 41a of which is to be filled with casting mass.

The system A1 operates as follows. The casting-resin components 3 and 4 are prepared in the storage containers 1, 2, namely are well mixed and simultaneously degassed. When a casting operation is supposed to be initiated, the cylinders 7a, 8a are lifted with the help of the pressure-medium cylinder 17, whereby the valves 33, 37 open the path from the lines 32, 36 into the pump cylinders 7, 8. A condition is illustrated in the drawings, in which condition the pump cylinders 7, 8 are already substantially filled. The driving fluid 20 or 21 which is provided above the pistons 7a, 8a is displaced into the containers 18, 19 with the valves 28, 29 open. Identical movement of both pistons 7a, 8a is effected by the beam 20 which is guided in the guide 13, 14. During the filling of the pump cylinders 7, 8 with mass components 3, 4 the valve 23 is opened such that air can discharge from the containers 18, 19 through an outlet 23a.

After the pump cylinders 7, 8 are filled, the valves 33, 37 are shifted so that the connection to the lines 32, 36 is blocked, but the connection to the lines 34, 38 is opened. When the filling of the mold is supposed to start, compressed air is introduced into the containers 18, 19 with the valve 23 open. The compressed air acts onto the driving fluids which, with the valves 28, 29 open, flow into the cylinders 7, 8 and press the pistons 7a, 8a downwardly, whereby again the guided beam 12 ensures that the movement of the two pistons occurs at the same rate. The two components 3, 4 are brought together in the mixer 35, which causes activated casting resin to be created. With the valve 39 open the activated resin is pressed into the cavity 41a. During the hardening (gelling) of the casting resin, the pressure of the driving fluids 20, 21, and thus also of the pressure of the casting resin components 3, 4 and thus also the pressure of the finish mixed casting resin, is maintained. Also during subsequent very slow further (final) pressing injection of casting resin into the mold the recipe (composition) of the incoming activated resin does not change, because in the absence of a pressure gradient (pressure drop) within the pump cylinders 7, 8 leakages therein are not created. During the pressing of the casting resin components 3, 4 out of the pump cylinders 7, 8, the valve 31 is adjusted so that air displaced by the piston 16 can flow out through the outlet 31a.

The piston rods 10, 11 can be relatively thin, since they need only transmit small forces; the actual discharge force is effected by the driving fluids 20, 21. The thinner the piston rods, 10, 11, the more equal is the pressure above and below the pistons 7a, 8a.

In the system according to FIG. 2, only one single storage container 42 is provided, in which casting resin 43, which is ready for casting is mixed and degassed. The storage container 42 can be constructed principally like the storage containers 1 and 2 according to FIG. 1. A valve 46 is arranged in a discharge line 44, which leads from storage container 42 to a pump cylinder 45.

The valve 46 has a valve seat 47, on which a sealing edge 48a of a valve piston 48 can abut sealingly. The valve piston 48 can slide in a cylinder 49, whereby between the cylinder 49 and the piston 48 there is provided a gap 50 of such a size that filler particles in the casting resin 43 cannot be jammed therein. The valve piston 48 is connected to a driving piston 52 through a piston rod 51, which driving piston 52 is movable in a driving cylinder 53. It is a single-acting cylinder with an inlet 54 and an outlet 55. Compressed air from a compressed-air source 56 can be fed to the driving cylinder 53 through a valve 57. The inlet 54 can with the valve 57 also be connected to an outlet opening 58.

The cylinder chamber above the valve piston 48 can be loaded with a driving fluid 59, which can be fed to the valve-driving cylinder 49 through a line 60 from a storage container 61. A valve 62 is built into the line 60. The space 61a in the storage container 61 can be loaded with compressed air, which also comes from a compressed-air source 56 and is guided through a valve 63. An outlet 64 can also be controlled with the valve 63, through which outlet air can escape from the container 61.

The pump cylinder 45 is in principle constructed like the pump cylinders 7, 8 in the system A1. Also in this cylinder there is provided a relatively large gap 65 between the piston 45a and the inner wall of the cylinder 45, in which gap filler particles cannot be jammed. The same driving fluid 59 which acts onto the valve piston 48 also acts on the upper side of the piston 45. The cylinder 45 is for this purpose connected through a line 66 to the storage container 61. A valve 67 is built into the line 66.

A pull-back cylinder 68 is also associated with the pump cylinder 45, the piston 69 of which pull-back cylinder is connected through a piston rod 70 to the piston 45a. The pull-back cylinder 68 is single-acting; it is connected to the compressed-air source 56 through a line 71. A valve 72 is built into the line 71, which valve can also be switched so that the line 71 is instead connected with an outlet 73.

A valve 75 is built into a discharge line 74 of the pump cylinder 45. The line 74 leads to a mold 76, the cavity 76a of which is to be filled with casting resin.

The system $A_2$ according to FIG. 2 operates as follows. When the pump cylinder 45 is supposed to be filled, the storage container 61 is vented by adjusting the valve 63 so that the outlet 64 is opened. The valve 62 is also open, so that a closing force does not act onto the valve piston 48. The valve 46 is opened by guiding compressed air under the piston 52 by suitable control of the valve 57. The piston 48 is lifted by this, whereby the driving fluid is pressed into the storage container 61 through the open valve 62. The pull-back cylinder 68 is filled with compressed air, by adjusting the valve 72 such that it connects the compressed-air source 56 to the cylinder 68 and closes the outlet 73. The piston 45a is pressed upwardly, whereby corresponding with the arrow 77 casting resin flows through the line 44 into the pump cylinder 45. The valve 75 remains normally closed. In order to assure a reliable opening of the valve 46, compressed air is introduced into the driving cylinder 53, which causes the valve piston 48 to be lifted. The air which is provided above the piston 52 vents through the outlet 55. The driving fluid which is provided above the valve piston 48 is pressed back into the container 61 with the valve 62 open.

When the pump cylinder 45 has been filled, the valve 46 is then closed. The container 61 is pressurized for this purpose by adjusting the valve 63 so that the outlet 64 is closed. The driving fluid is pressed by the compressed air into the valve cylinder 49, which causes the valve piston 48 to be pressed down onto its seat 47. The driving fluid is furthermore pressed into the pump cylinder 45 through the line 66 with the valve 67 open. When now the casting (injection) valve 75 is opened, the mold cavity 76a is filled. The pressure in the mold cavity 76a is maintained, in order to compensate for volume losses due to shrinkage in the casting material during gelling. Since a significant pressure difference between the casting mass 43 and the driving fluid 59 does not exist, leakages of the casting resin 43 are avoided, so that also during long-lasting gelling operations one need not fear having the activated casting resin reach areas of the system where the hardening of the casting resin could do damage.

The valve 46 closes very reliably, since a gap-free seal is provided between valve seat 47 and sealing edge 48A of valve piston 48. The large clearance of the valve piston 48 makes the valve guiding insensitive toward abrasive particles in the casting resin. The driving fluid 59, just like the driving fluids 20 and 21 (of system $A_1$), is made so that its mixing, as it can occur to a very small degree, with the casting resin components (system $A_1$) or with the resin ready to be injected (system $A_2$), is innocuous. For example, the same material can be used as driving fluid as for casting resin or casting resin component, though as a rule without fillers in the driving fluid. However, it is also possible to use, as the driving fluid, substances which at least exist in the casting resin components or in the finish-mixed casting resin.

The system $A_3$ according to FIG. 3 has a storage container 42, which corresponds with the storage container 42 of the system $A_2$. Four output lines 78 to 81 are connected to the storage container. One valve 46 each is provided in each output line, which valve corresponds with the valve 46 of the system $A_2$. A pump cylinder 45 is provided behind each valve 46, which pump cylinder 45 corresponds with the pump cylinder 45 of the system $A_2$ and a casting valve 75 is provided behind each pump cylinder, which casting valve 75 corresponds with the casting valve 75 of the system $A_2$. A relatively large mold 82 is fed from the discharge line 78, a smaller mold 83 from the line 89, a casting (injection) nozzle 84 from the line 80 and a further casting nozzle 85 from the line 81. Thus it is possible to supply from one single storage container 42 for finish-mixed resin several injection points.

Figure 4:
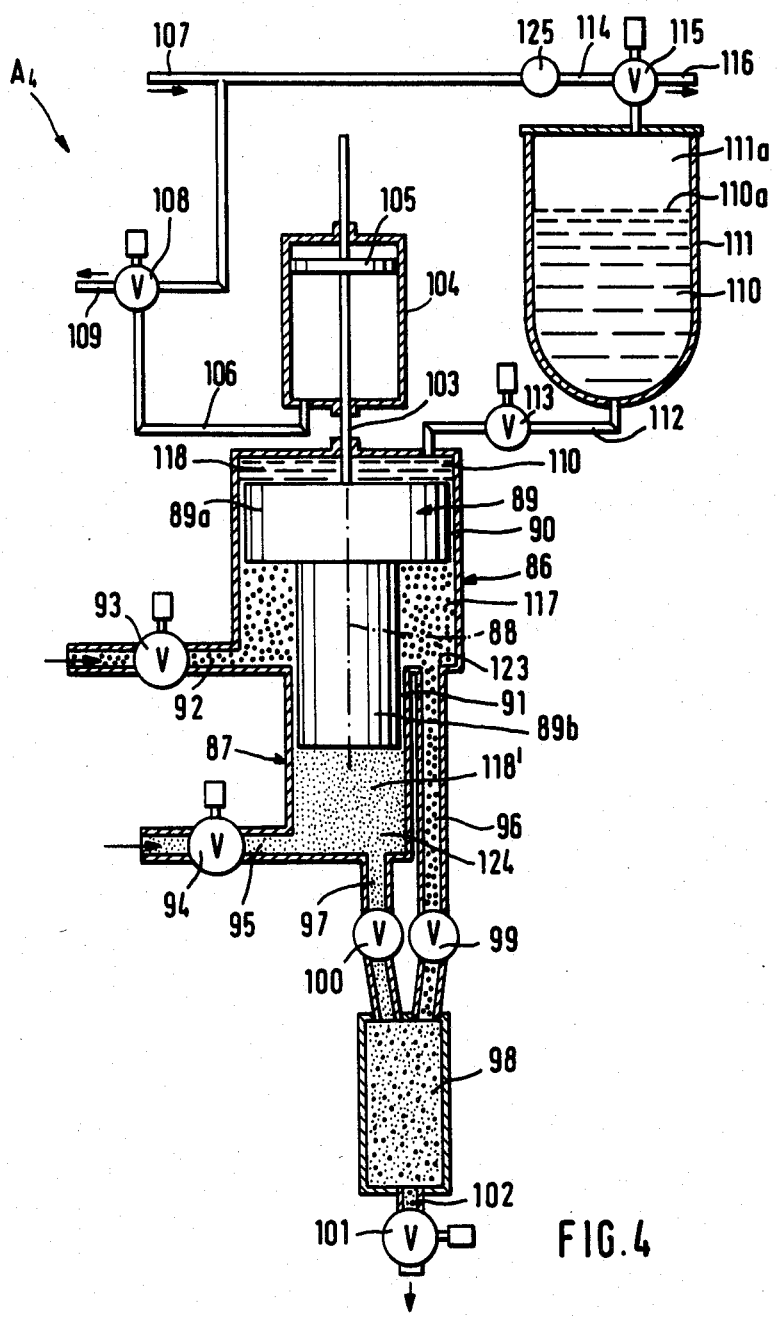
FIG. 4 illustrates a system, which is designated for the processing of two casting resin components, whereby the mechanical connection of two pump cylinders is effected by a differential piston.

The system $A_4$ according to FIG. 4 has two pump cylinders 86 and 87. Said cylinders are coaxial to one another, that is they have a common axis 88. A differential piston 89 is movable in the pump cylinders 86, 87. The differential piston 89 has a thick portion 89a and a thin portion 89b. The thick portion 89a has a gap 90 relative to the cylinder 86, which gap in turn is sufficiently wide that the filler particles cannot be jammed. The thin cylinder portion 89b has a gap 91 relative to the cylinder 87, which gap again is sufficiently large as to prevent jamming of filler particles therein.

A supply line 92 is connected to the pump cylinder 86, into which supply line is built a valve 93. The supply line 92 can lead from a storage container which is constructed like the storage container 1 in the system $A_1$. A supply line 95 which is provided with a valve 94 is connected to the pump cylinder 87, which supply line 95 leads from a further storage container like container 2 of FIG. 1.

A line 96 leads from the pump cylinder 86 and a line 97 from the pump cylinder 87 both to a mixer 98. A valve 99 is built into the line 96 and a valve 100 into the line 97. A casting (injection) valve 101 is arranged behind the mixer 21, which casting valve is provided in a casting line 102 which exits from the mixer 98.

A piston rod 103 is connected to the differential piston 89, which piston rod projects into a pull-back cylinder 104. A piston 105 is slidable in the pull-back cylinder 104, which piston is connected fixedly to the piston rod 103. The pull-back cylinder 104 is single-acting and can be loaded through a line 106 with compressed air supplied from a compressed-air source 107. A valve 108 is built into the line 106, which valve can be switched so that the line 106 can be connected to an outlet 109 with simultaneous closure of the line portion which comes from the compressed-air source 107.

A driving fluid 110 can act onto the entire cross section (except for the small cross section of the piston rod 103) of the piston thick portion 89a. The driving fluid comes from a storage container 111, which is connected to the pump cylinder 86 through a line 112. A valve 113 is built into the line 112. Compressed air can be introduced into the space 111a above the level 110a of the driving fluid 110. The compressed air comes also from the compressed-air source 107 and is supplied through a line 114, into which a valve 115 is built. The valve 115 can also be adjusted so that the space 111a can be ventilated through an outlet 116.

The system $A_4$ operates as follows. When the pump cylinders 86, 87 are supposed to be filled (from the not illustrated storage containers) with casting resin components 123, 124, the valves 93 and 94 are open, while the valves 99 and 100 are closed. The valve 113 is open and the valve 115 is adjusted so that air can escape at 116 from the space 111a. Compressed air is introduced into the pull-back cylinder 104, which compressed air moves the piston 105, and because of its coupling through the piston rod 103 also the differential piston 89, upwardly. Driving fluid 110 is thereby pressed back into the container 111. After ending the filling stroke, the valves 93 and 94, which can be constructed like the valve 46 of the system $A_2$, are closed. The driving fluid 110 is thereafter pressurized by introducing compressed air into the container 111. The pressure acts on the differential piston 89. When casting resin is supposed to be mixed and injected, the valves 99, 100 are opened, as is also the casting valve 101.

The driving fluid 110 presses the differential piston downwardly, whereby from the pump cylinder 86 and 87 casting resin components are pressed through the lines 96 and 97 into the mixer 98. In the space 117 below and in the space 118 above the thick piston portion 89a there exist the same pressures, so that a pressure gradient does not exist, due to which mass could flow out of the space 117. Also the pressures in the space 118' below the thin portion 89b of the differential piston and in the space 117 are the same, so that also through the gap 91 no significant flow occurs. This pressure equality exists due to the connection of both spaces 117, 118' through the lines 96, 97 to the mixer 98. Thus the same pressures exist in the three spaces, namely the space 118 above the thick piston portion 89a, in the space 117 below the thick piston portion 89a and in the space 118' below the thin piston portion 89b.

Activated casting mass can be removed as a stream or in discrete portions through the casting valve 101. However, it is also possible to fill a mold and the pressure in the mold can be maintained during the gelling, as was described in the example of the systems $A_1$ and $A_2$.

The embodiment according to FIG. 4 is particularly simple, since a special device for synchronizing the movements of the two pistons is not needed. The use of the differential piston meets the same purpose as the coupling of the pistons 7a, 8a through the beam 12 and the guiding of the beam in the guide device 13, 14 in the system $A_1$.

Figure 5:
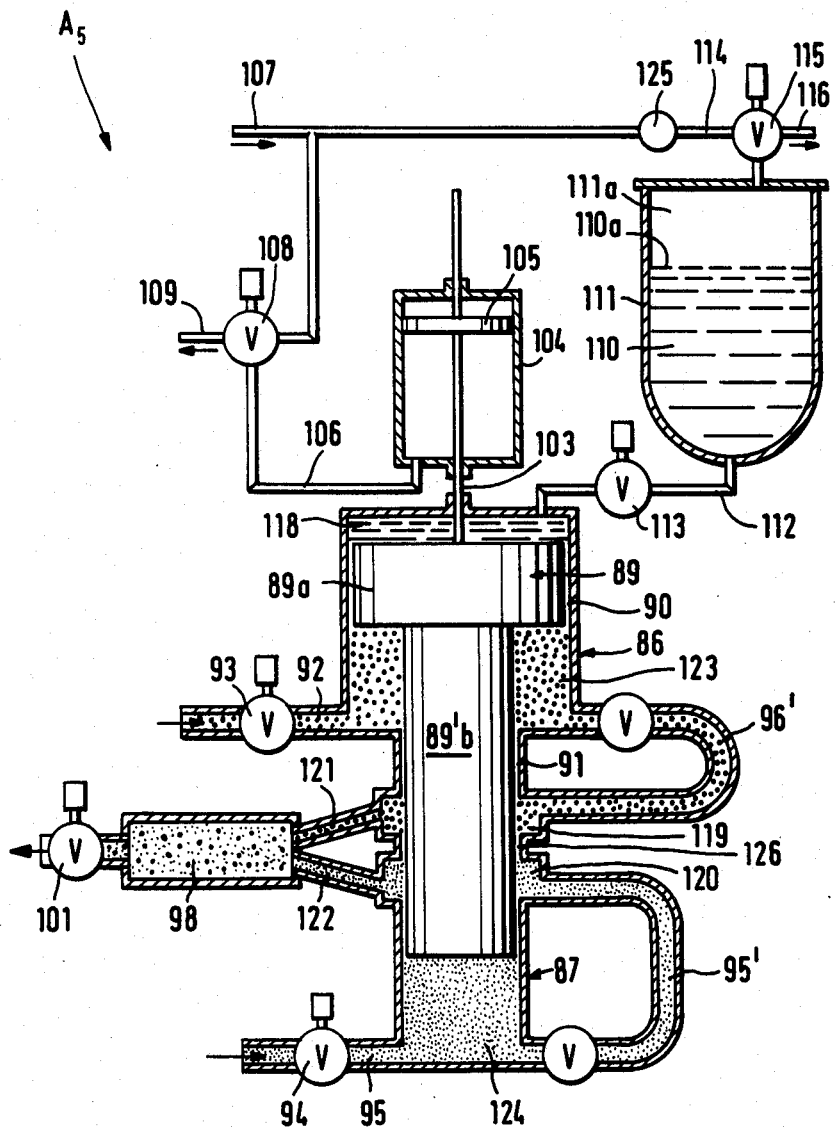
FIG. 5 illustrates a system which corresponds with FIG. 4, but in addition provides annular chambers.

The system $A_5$ according to FIG. 5 equals substantially the system $A_4$. Corresponding parts are characterized with the same reference numerals. Differences from the system $A_4$ are as follows.

In the system $A_5$ the discharge line 96' out of the pump cylinder 86 leads to an annular chamber 119, which surrounds the thin piston portion 89'b of the differential piston. The thin piston portion 89'b is constructed longer than the thin piston portion 89b of the system $A_4$. The discharge line 95' out of the pump cylinder 87 leads to an annular chamber 120 which is arranged at a small axial distance from the annular chamber 119. The annular chambers 119, 120 are connected through lines 121, 122 to the mixer 98.

Through the arrangement of the annular chambers 119, 120 it is achieved that the casting resin components 123, 124 can come into contact with one another at most in the short space 126 between the chambers 119, 120. With this one avoids the danger that activated resin mass can spread over the greater length of the gap 91, which activated mass could by hardening lead to breakdowns in operation. A constant material change takes place through the annular chambers, which material change keeps the critical area clean. In other respects, the system $A_5$ operates like the system $A_4$, so that further discussions are not necessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an injection-molding apparatus the improvement, comprising: at least one pump cylinder in which a piston is slidable, which piston divides the cylinder into a pump chamber and a drive chamber, means for introducing an unencased casting resin or casting resin component into said pump chamber at a first pressure, means for introducing a driving fluid compatible with said casting resin or casting resin component into said drive chamber at a second pressure similar to but somewhat exceeding said first pressure for driving said piston, gap means spacing said piston from the wall of said cylinder for preventing jamming of filler particles therebetween and resultant scoring of said piston and cylinder wall, said piston and cylinder wall being free of mechanical seals therebetween, said means for introducing a driving fluid comprising container means for said driving fluid connected to said drive chamber and means connected to said container means for pressurizing said driving fluid, active surfaces of the piston which contact with the driving fluid and the casting resin or the casting resin components being at least approximately of the same size.

2. An injection-molding apparatus according to claim 1, wherein the capacity of the pump chamber is greater than is necessary for the complete filling of a mold.

3. An injection-molding apparatus according to claim 1, including a piston rod secured on the piston, which piston rod projects from the cylinder and a drive mechanism engaging the piston rod and by which the piston can be driven to enlarge the pump chamber.

4. An injection-molding system according to claim 3, including several said pump cylinders, the pistons of which are mechanically coupled with one another by a mechanical connection for achieving at least proportional strokes, only one said drive mechanism engaging the mechanical connection.

5. An injection-molding apparatus according to claim 4, wherein the mechanical connection comprises a rigid beam, to which are secured the piston rods connected to the pistons, and a separate guide parallel with the cylinder axes and associated with the beam.

6. An injection-molding apparatus according to claim 4, wherein the pistons are parts of a differential piston, which differential piston has one face stepped to define parts of different cross section, the driving fluid acting on the largest cross section face of the differential piston and the sum of the cross sections of the stepped face being equal to the mentioned largest cross section.

7. An injection-molding apparatus according to claim 6, including annular chambers which surround sections of the differential piston which come into contact with different casting resin components, which annular chambers are connected to respective pump chambers, wherein between adjacent annular chambers there exists only a small distance.

8. An injection-molding apparatus according to claim 1, including evacuatable storage containers for the casting resin or casting resin components, a respective said pump cylinder being associated with each storage container.

9. An injection-molding apparatus according to claim 1, including a valve at the inlet into the pump cylinder, said valve being a piston valve having a piston which is sealed off with respect to a cylinder by a gap seal, said cylinder being loaded with a driving fluid compatible with the casting resin or the casting resin components.

10. An injection-molding apparatus according to claim 1, including several pump cylinders connected to a storage container for ready-mixed casting resin.

11. An injection-molding apparatus according to claim 1, wherein the driving fluid acts on the end of the pump piston on which the piston rod is provided.

12. An injection-molding apparatus according to claim 1, including a storage chamber for the driving fluid and an apportioning means between the pump cylinder and driving fluid storage chamber.

* * * * *